(12) United States Patent
Nagai et al.

(10) Patent No.: US 8,874,393 B2
(45) Date of Patent: Oct. 28, 2014

(54) BATTERY PACK, ELECTRONIC DEVICE, AND INSPECTION METHOD OF BATTERY PACK

(75) Inventors: Hiroki Nagai, Nagano (JP); Takayuki Yajima, Nagano (JP); Tsuyoshi Ohkubo, Nagano (JP)

(73) Assignee: Sony Corporation (JP)

( * ) Notice: Subject to any disclaimer, the term of this patent is extended or adjusted under 35 U.S.C. 154(b) by 706 days.

(21) Appl. No.: 13/101,457

(22) Filed: May 5, 2011

(65) Prior Publication Data

US 2011/0282604 A1   Nov. 17, 2011

(30) Foreign Application Priority Data

May 13, 2010   (JP) ................................. P2010-111484

(51) Int. Cl.
| G01R 21/06 | (2006.01) |
| G01R 31/36 | (2006.01) |
| G01R 19/00 | (2006.01) |
| G06F 1/26  | (2006.01) |

(52) U.S. Cl.
CPC ..................................... *G06F 1/263* (2013.01)
USPC .................................... 702/63; 702/60; 702/64

(58) Field of Classification Search
CPC .................................. G06F 1/26; G06F 1/263
USPC .................................................. 702/60, 63, 64
See application file for complete search history.

(56) References Cited

U.S. PATENT DOCUMENTS

| 2004/0220758 A1* | 11/2004 | Barsoukov et al. | 702/63 |
| 2008/0077339 A1* | 3/2008 | Seo et al. | 702/63 |
| 2008/0255783 A1* | 10/2008 | Tamai | 702/63 |
| 2009/0024339 A1* | 1/2009 | Shoji | 702/63 |
| 2010/0007310 A1 | 1/2010 | Kawamoto et al. | |
| 2010/0250163 A1* | 9/2010 | Maegawa et al. | 702/63 |

FOREIGN PATENT DOCUMENTS

| JP | 2005-321963 A | 11/2005 |
| JP | 2010-040499 A | 2/2010 |

* cited by examiner

*Primary Examiner* — Janet Suglo
(74) *Attorney, Agent, or Firm* — Lerner, David, Littenberg, Krumholz & Mentlik, LLP

(57) ABSTRACT

A battery pack includes: a chargeable and dischargeable battery; and a microcomputer that acquires information on a voltage drop across the battery in a condition equivalent to no load and stores the information therein.

4 Claims, 4 Drawing Sheets

OUTWARD VIEW OF INFORMATION PROCESSING APPARATUS

EXAMPLE OF BLOCK CONFIGURATION OF INFORMATION PROCESSING APPARATUS

EXAMPLE OF INTERNAL CONFIGURATION OF BATTERY PACK

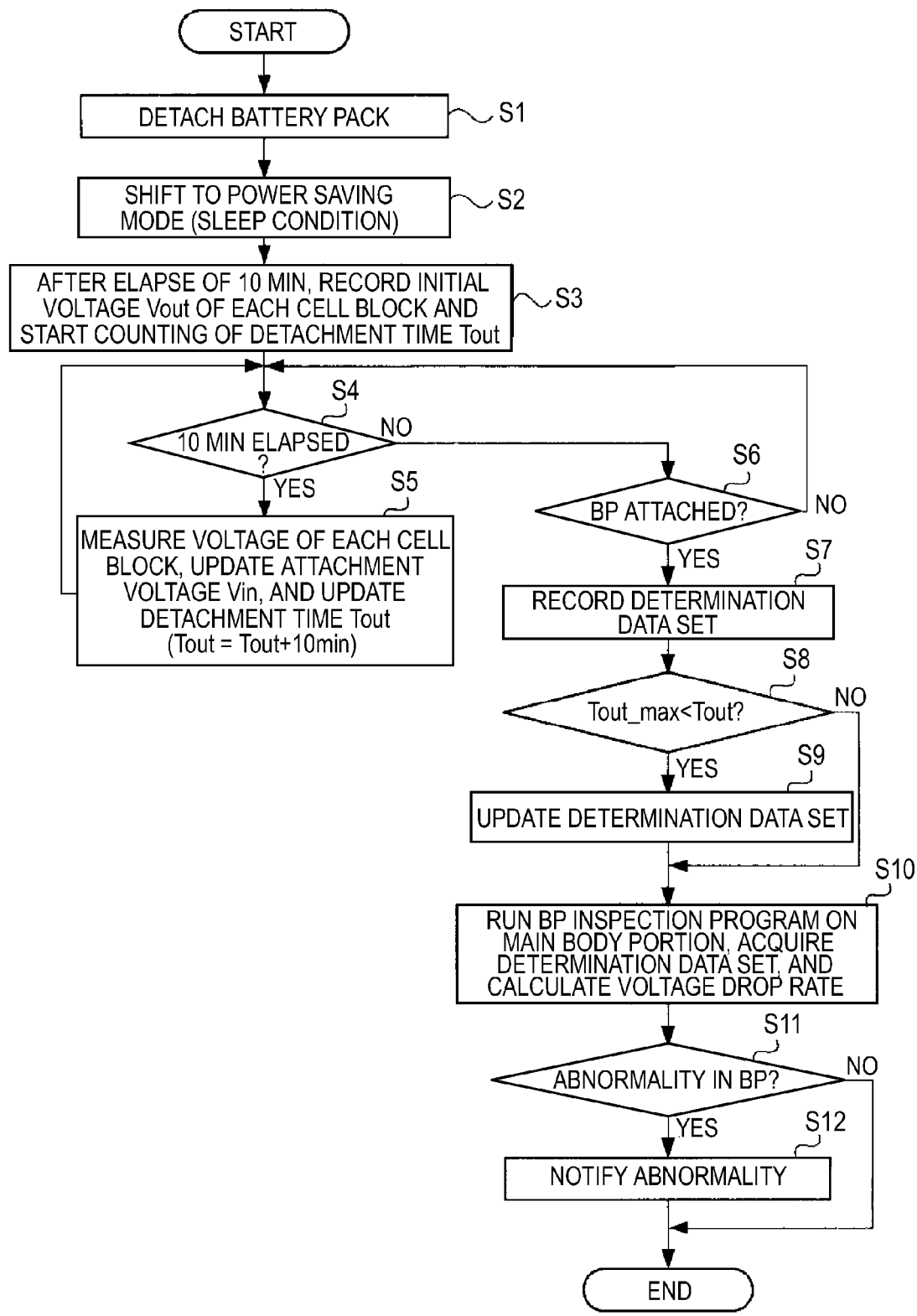

BATTERY PACK, ELECTRONIC DEVICE, AND INSPECTION METHOD OF BATTERY PACK

CROSS-REFERENCE TO RELATED APPLICATION

The present application claims priority from Japanese Patent Application No. JP 2010-111484 filed in the Japanese Patent Office on May 13, 2010, the entire content of which is incorporated herein by reference.

BACKGROUND OF THE INVENTION

1. Field of the Invention

The present invention relates to a battery pack, an electronic device, and an inspection method of a battery pack, and more particularly, to a battery pack used in a portable electronic device, such as a notebook computer, an electronic device including the same, and an inspection method of a battery pack.

2. Description of the Related Art

Many portable electronic devices, for example, notebook computers, are driven by a battery pack. There have been proposed various techniques for such a battery pack to ensure safety by preventing serious accidents, such as emission of smoke from the battery pack and firing of the battery pack as are described, for example, in JP-A-2010-40499 and JP-A-2005-321963.

According to a technique proposed in JP-A-2010-40499, a microcomputer is incorporated in a battery pack to calculate a charge current including temperature information of the battery pack using the microcomputer so that a current amount and an output stopping function on the charger side are controlled according to the calculation result.

Further, according to a technique proposed in JP-A-2005-321963, information on a defect of a battery pack is detected by a power supply controller in an electronic device when the battery pack is attached to the electronic device so that charge to the battery pack is regulated in the event of a defect.

SUMMARY OF THE INVENTION

As has been described, various inspection techniques have been proposed to improve safety of the battery pack in the related art. However, it is quite difficult to detect all abnormal causes of the battery pack by various inspection techniques described above. For example, in order to detect an abnormal event causing a slight variance that is difficult to detect during charge and discharge cycles, special equipment or a circuit change becomes necessary separately. Further, it is well anticipated that the safety standards for the battery pack are set more strictly.

Thus, it is desirable to further improve safety of a battery pack by detecting an abnormal cause that has been difficult to detect in the related art, using a simpler configuration.

According to an embodiment of the present invention, there is provided a battery pack including a chargeable and dischargeable battery, and a microcomputer that acquires information on a voltage drop across the battery in a condition equivalent to no load and stores the information therein.

The phrase, "condition equivalent to no load", referred to herein includes not only a condition in which the battery pack is neither charged nor discharged, but also, for example, a condition in which power consumption of the battery pack is constant with respect to time.

According to another embodiment of the present invention, there is provided an electronic device including: a chargeable and dischargeable battery, a voltage information acquisition portion, and an abnormal determination portion. Functions of the respective components are as follows. That is, the voltage information acquisition portion acquires information on a voltage drop across the battery in a condition equivalent to no load and stores the information therein. The abnormal determination portion reads out the information on the voltage drop across the battery stored in the voltage information acquisition portion and determines presence or absence of an abnormality in the battery on the basis of the read information on the voltage drop across the battery.

According to still another embodiment of the present invention, there is provided an inspection method of a battery pack in an electronic device including the battery pack described above, a battery pack attachment portion to which the battery pack is attached, and an abnormal determination portion. The inspection method is carried out as follows. Herein, the abnormal determination portion determines presence or absence of an abnormality in the battery pack attached to the battery pack attachment portion. Initially, the microcomputer in the battery pack acquires information on a voltage drop across the battery in a condition equivalent to no load and stores the information therein. Subsequently, the abnormal determination portion reads out the information on the voltage drop across the battery stored in the battery pack via the battery pack attachment portion. The abnormal determination portion then determines the presence or absence of an abnormality in the battery pack on the basis of the read information on the voltage drop across the battery.

As has been described, according to the embodiments of the present invention, the microcomputer (or the voltage information acquisition portion) in the battery pack acquires information on a voltage drop across the battery while the battery pack is in a condition equivalent to no load and makes an abnormal determination of the battery pack on the basis of the acquired information. It thus becomes possible to detect an abnormal event causing a slight variance that is difficult to detect while the battery pack is charged or discharged.

Hence, according to the embodiments of the present invention, it is possible to detect even an abnormal event causing a slight variance that is difficult to defect during charging and discharging cycles. Also, according to the embodiments of the present invention, the microcomputer in the battery pack acquires information on a voltage drop across the battery in a condition equivalent to no load and makes an abnormal determination of the battery pack on the basis of the acquired information. Hence, in the embodiments of the present invention, for example, neither special equipment nor a circuit change is necessary in order to detect an abnormal event causing a slight variance.

In other words, according to the embodiments of the present invention, it is possible to detect an abnormal cause of the battery pack that has been difficult to detect in the related using a simpler configuration, which can in turn further improve safety of the battery pack.

BRIEF DESCRIPTION OF THE DRAWINGS

FIG. 4 is a flowchart depicting the procedure of an inspection method of the battery pack according to the embodiment of the present invention.

DESCRIPTION OF THE PREFERRED EMBODIMENT

Hereinafter, examples of an electronic device, a battery pack, and an inspection method of a battery pack according to an embodiment of the present invention will be described with reference to the drawings in the following order.

1. Configuration of information processing apparatus
2. Configuration of battery pack
3. Inspection method of battery pack In the following, descriptions will be given to a case where a portable information processing apparatus, such as a notebook computer, is used as an electronic device by way of example. It should be appreciated, however, that the present invention is not limited to this case. For example, the configuration of a battery pack and an inspection method thereof described below are also applicable to arbitrary electronic device and electric automobile driven by a battery pack.

<1. Configuration of Information Processing Apparatus>

[Outward Configuration of Information Processing Apparatus]

Figure 1A:
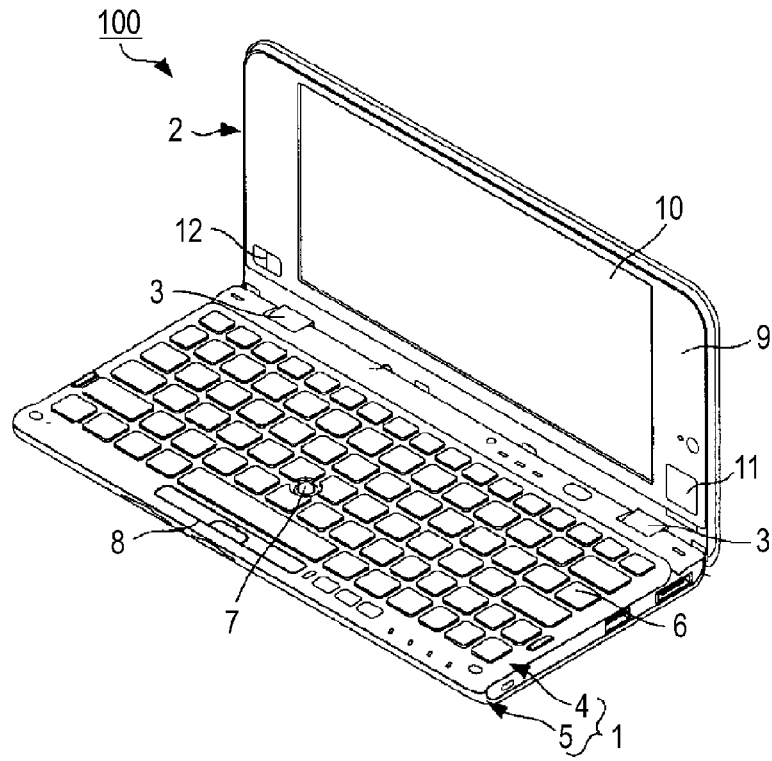
FIG. 1A and FIG. 1B are outward perspective views of an information processing apparatus according to an embodiment of the present invention.
Figure 1B:
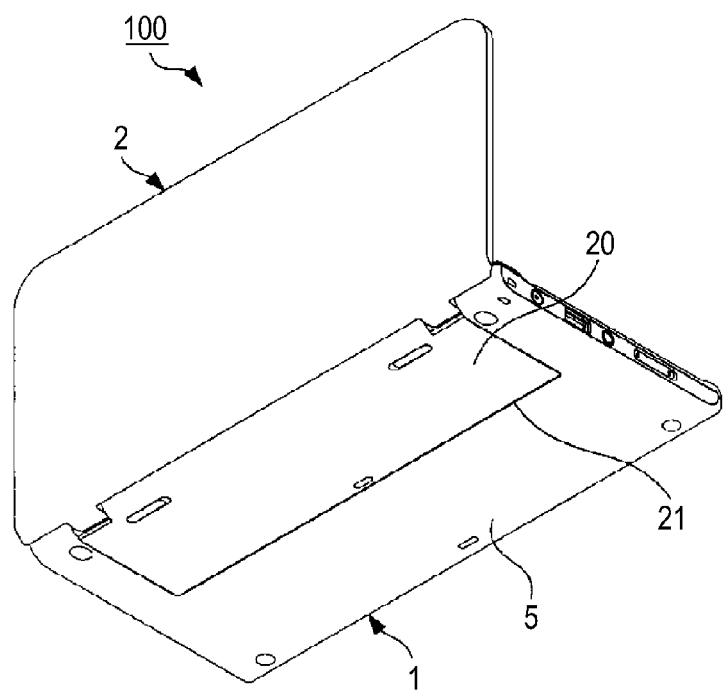

FIG. 1A and FIG. 1B are outward perspective views of an information processing apparatus according to an embodiment of the present invention. FIG. 1A is an outward perspective view of the information processing apparatus on a display screen side described below and FIG. 1B is an outward perspective view of the information processing apparatus on the side opposite to the display screen.

An information processing apparatus 100 includes a main body portion 1, a display portion 2, and two hinges 3. In an example shown in FIGS. 1A and 1B, the two hinges 3 are attached to the main body portion 1 in the vicinity of the both ends of a longer end portion 1a on the side of the display portion 2. The display portion 2 is attached to the main body portion 1 via the two hinges 3. Also, the display portion 2 is attached to pivot with respect to the main body portion 1 about a line linking centers of the two hinges 3 as a center axis. The display portion 2 is opened and closed with respect to the main body portion 1 by pivotal motions of the display portion 2.

The main body portion 1 includes a palm rest unit 4 (keyboard unit) forming a portion on the top side (side opposing the display portion 2) and a main body unit 5 forming a portion on the bottom side of the main body 1. The main body portion 1 is formed by integrally combining the palm rest unit 4 and the main body unit 5. Both the palm rest unit 4 and the main body unit 5 are formed of a plurality of members without noticeable screws or the like on the exterior.

The palm rest unit 4 is provided with operation devices, for example, a keyboard 6, a stick pointer 7, and a first click button 8. The stick pointer 7 is an operation device used, for example, for an operation to move a cursor (pointer) displayed on a display screen 10 described below and an operation to scroll the display screen 10.

Although it is not shown in FIG. 1A and FIG. 1B, the main body unit 5 incorporates, for example, a printed circuit board on which a plurality of electronic components are mounted, a radiation unit, and drives, such as a hard disc drive. On the printed circuit board are mounted a CPU (Central Processing Unit), a memory, and other electronic components.

As is shown in FIG. 1B, the main body unit 5 includes a battery pack 20 re-attachable to the main body unit (main body portion 1) on the bottom side. The internal configuration of the battery pack 20 will be described in detail below.

Further, the main body unit 5 includes a battery pack attachment portion 21 to which the battery pack 20 is attached. The battery pack attachment portion 21 has input and output terminals (not shown) that electrically connect various electronic components mounted on the printed circuit board and the battery pack 20. In this embodiment, the battery pack attachment portion 21 is formed to recess in the exterior surface of the bottom portion of the main body unit 5. When the battery pack 20 is attached to the battery pack attachment portion 21 as is shown in FIG. 1B, the exterior surface of the battery pack 20 is flush with the bottom surface of the main body unit 5.

The display portion 2 includes a case 9, and the display screen 10, a touch pad 11, and a second click button 12 provided to the case 9 on the surface opposing the main body portion 1, as well as a display processing unit (not shown) provided inside the case 9 and performing predetermined display processing.

The display screen 10 is a screen on which to display various types of information, for example, characters and images. The touch pad 11 is an operation device used for an operation to move the cursor (pointer) displayed on the display screen 10 and an operation to scroll the display screen 10. In this embodiment, a capacitance sensor is used as the touch pad 11.

[Internal Configuration of Information Processing Apparatus]

Figure 2:
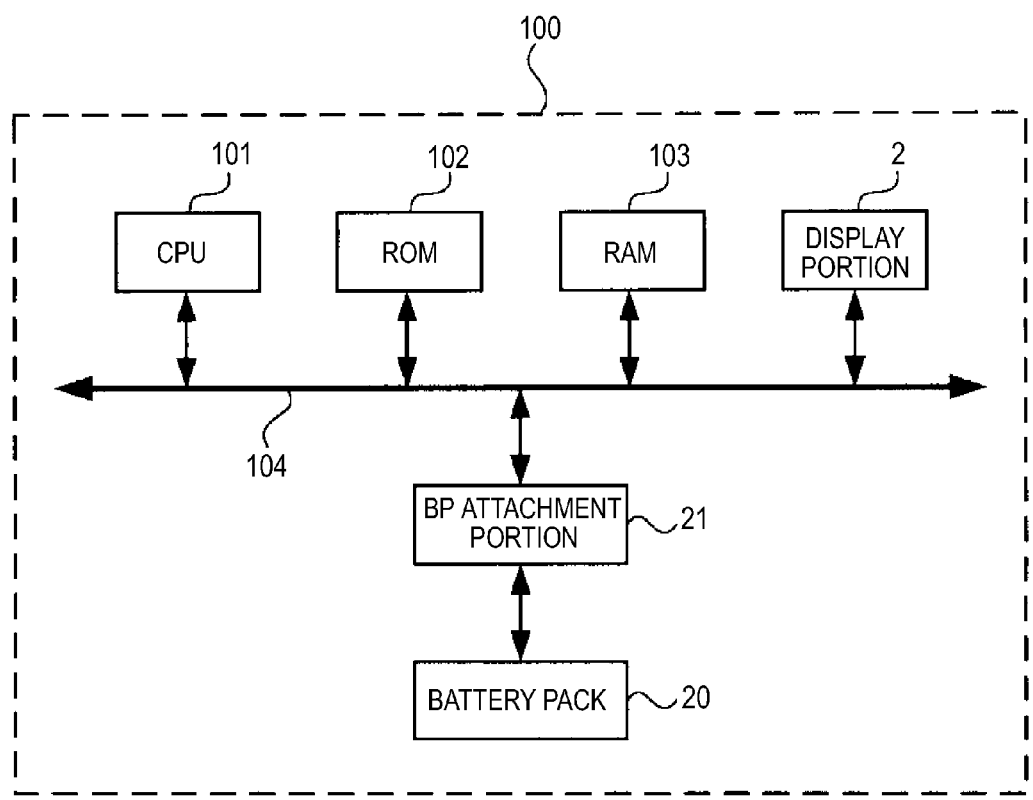
FIG. 2 is a block diagram showing the configuration of the information processing apparatus according to the embodiment of the present invention.

The internal configuration of the information processing apparatus 100 of this embodiment will now be described with reference to FIG. 2. FIG. 2 is a block diagram showing the hardware configuration of the information processing apparatus 100. It should be appreciated, however, that FIG. 2 shows only a portion necessary for an inspection method of the battery pack 20 of this embodiment described below for ease of description.

The information processing apparatus 100 includes a CPU 101, a ROM (Read Only Memory) 102, a RAM (Random Access Memory) 103, the display portion 2, the battery pack attachment portion 21, and the battery pack 20. The CPU 101, the ROM 102, the RAM 103, the display portion 2, and the battery pack attachment portion 21 are electrically interconnected via a bus 104. Also, the battery pack 20 is connected to the CPU 101, the ROM 102, the RAM 103, and the display portion 2 via the battery pack attachment portion 21.

The CPU 101 functions as an arithmetic processing unit and a controller. More specifically, the CPU 101 controls all or a part of operations by the information processing apparatus 100 according to various programs recorded, for example, in the ROM 102 or the RAM 103. Accordingly, an inspection operation of the battery pack 20 by the information processing apparatus 100 of this embodiment described below is controlled by the CPU 101.

The ROM 102 stores programs, computation parameters, and the like used by the CPU 101. Accordingly, an inspection program used for the inspection method of the battery pack 20 described below is also stored in the ROM 102. The RAM 103 temporarily stores programs used when the CPU 101 performs predetermined processing and parameters necessary to run the programs. It should be noted that data, such as the programs and the computation parameters, is inputted in and outputted from any of the CPU 101, the ROM 102, and the RAM 103 via the bus 104.

Although it is not shown in the drawing, the battery pack attachment portion 21 has, for example, a detection portion detecting attachment of the battery pack 20, a power charge and discharge terminal, and an information terminal via which information from and to a microcomputer in the battery pack 20 described below is inputted in and outputted from the main body portion 1. Accordingly, when the battery pack 20 is attached to the battery pack attachment portion 21, various types of monitor information (for example, a voltage and a temperature) measured by the battery pack 20 are outputted, for example, to the CPU 101 via the information terminal of the battery pack attachment portion 21.

It should be appreciated that the internal configuration (hardware configuration) of the information processing apparatus 100 described above is a mere example and the information processing apparatus 100 may be formed using general-purpose members as the respective components described above or may be formed of hardware specialized in functions corresponding to those furnished to the respective components. Hence, a hardware configuration to be used can be changed appropriately according to technical levels at which this embodiment is implemented.

<2. Configuration of Battery Pack>

Figure 3:
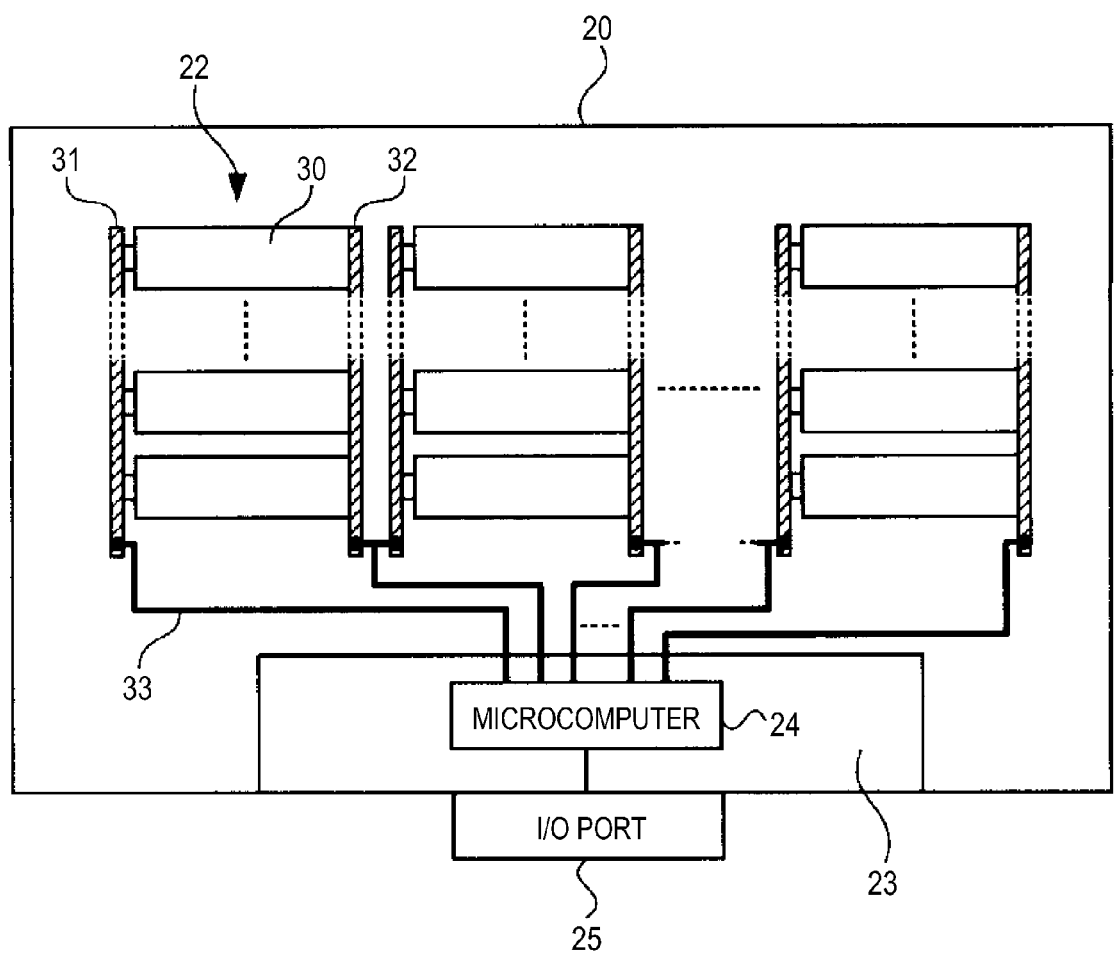
FIG. 3 is a view schematically showing the configuration of a battery pack according to the embodiment of the present invention.

FIG. 3 shows the internal configuration of the battery pack 20 used in the information processing apparatus 100 of this embodiment. The battery pack 20 includes a control board 23 on which a plurality of battery cell blocks 22 and a microcomputer 24 are mounted, and an input and output port 25.

Each battery cell block 22 is formed of a plurality of battery cells 30 (battery). In this embodiment, lithium-ion batteries are used as the battery cells 30. In each battery cell block 22, cathodes of a plurality of the battery cells 30 are connected together at a positive electrode 31 and anodes at a negative electrode 32. In short, a plurality of the battery cells 30 are connected in parallel in each battery cell block 22. It should be noted that the number of the battery cells 30 forming each cell block 22 can be set, for example, according to intended use. Hence, each cell block 22 may be formed of only one battery cell 30 depending on intended use. Also, the type of the battery cells 30 is not limited to a lithium-ion battery and the type can be also changed, for example, to suit intended use.

In the battery pack 20 of this embodiment, a plurality of the battery cell blocks 22 are disposed in line so that the cathodes (or anodes) of the battery cells 30 are oriented in the same direction and the negative electrode 32 of one battery cell block 22 and and the opposing positive electrode 31 of the adjacent battery cell block 22 are electrically connected to each other. In short, a plurality of the battery cell blocks 22 are connected in series in the battery pack 20.

Also, in the battery pack 20 of this embodiment, each of the positive electrode 31 and the negative electrode is connected in parallel to the microcomputer 24 via a voltage detection line 33. When connected in this manner, the microcomputer 24 becomes capable of measuring a voltage of each voltage cell block 22.

The microcomputer 24 (voltage information acquisition portion) is formed, for example, of an integrated circuit having, for example, a CPU and a ROM mounted on a single chip. The microcomputer 24 controls, for example, charge and discharge of the battery pack 20 when the battery pack 20 is attached to the main body portion 1 and measures, for example, a voltage and a temperature of each battery cell block 22. Also, as will be described below, in this embodiment, even after the battery pack 20 is detached from the main body portion 1 and the operation mode shifts to a power saving mode, the microcomputer 24 acquires information for abnormal determination by measuring, for example, a voltage drop across each battery cell block 22 and an elapsed time since the detachment.

The input and output port 25 is provided with terminals corresponding to the respective terminals provided to the battery pack attaching portion 21. When the battery pack 20 is attached to the main body portion 1, charge and discharge operations of the battery pack 20 and an output operation of information for abnormal determination (information on a voltage drop across the battery) are performed via the input and output port 25.

<3. Inspection Method of Battery Pack>

An example of an inspection method of the battery pack 20 described above and the battery pack 20 of the information processing apparatus 100 including the same will now be described.

[Principle of Inspection Method]

In this embodiment, for example, abnormal events, such as an initial failure, an abnormal consumption current (capacitor leakage) of the control board 23, poor welding of electrodes, poor soldering at the midpoint of a battery cell, entrance of foreign matter into the battery cell 30 (contamination), and breaking (perforation) of the battery cell 30, are detected.

Upon occurrence of abnormal events as above, for example, a voltage drop rate of one or both of the entire battery pack 20 and each battery cell block 22 or an unbalance amount of the voltage drop rate among the battery cell blocks 22 are increased. Hence, the abnormal events as above can be detected by measuring the voltage drop rate of one or both of the entire battery pack 20 and each battery cell block 22.

In a case where a voltage drop rate and an unbalance amount caused by the abnormal events as above are large, the abnormal events can be detected while the battery pack 20 is attached to the main body portion 1. However, a voltage drop rate and an unbalance amount caused by the abnormal events other than an initial failure are normally so small that influences of charge and discharge make it difficult to detect the abnormal events while the battery pack 20 is attached to the main body portion 1. In addition, influences of the abnormal events are substantially negligible at the time of shipping but become more significant with an increasing number of charge cycles and may possibly develop into a quite serious trouble.

Such being the case, in order to detect abnormal events causing only a slight variance as described above, this embodiment is configured to measure a voltage of the battery pack 20 and a variance thereof while the battery pack 20 is in an unloaded condition (condition where the battery pack 20 is neither charged nor discharged) and also to perform an abnormal detection on the basis of the measurement result. This configuration makes it possible to detect the abnormal events described above that are otherwise difficult to detect while the battery pack 20 is attached to the main body portion 1.

In the following, the principle of the inspection method of the battery pack 20 of this embodiment will be described more concretely. In this embodiment, the battery pack 20 is detached from the main body portion 1 first to bring the battery pack 20 in an unloaded condition. Thereafter, information on a voltage drop across the battery cells 30 is automatically measured and recorded by the microcomputer 24 in a state, for example, where a voltage drop across the battery pack 20 stays at substantially a constant level or becomes more stable. In this embodiment, as the information on a voltage drop across the battery cells 30, a voltage of each battery cell block 22 and a variance thereof in an unloaded condition and an elapsed time since the detachment of the battery pack 20 are measured by the microcomputer 24 and the acquired information is recorded in an internal ROM of the microcomputer 24.

Subsequently, when the battery pack 20 is re-attached to the main body portion 1, various types of data recorded in the battery pack 20 while it was detached are read on the side of the main body portion 1 to calculate a voltage drop rate $\Delta V/h$ of one or both of the entire battery pack 20 and each battery cell block 22 while the battery pack 20 was detached. The CPU 101 in the main body portion 1 then determines the presence or absence of an abnormality in the battery pack 20 on the basis of the calculation result.

It should be noted that a lithium-ion battery has a small self-discharge amount. Hence, in a case where lithium-ion batteries are used as the battery cells 30 as in this embodiment, there is a relatively large difference between a voltage drop rate at a normal time and a voltage drop rate at the occurrence of an abnormality in an unloaded condition and the abnormal events described above can be detected more easily.

[Concrete Example of Inspection Method]

A concrete example of the inspection method of the battery pack 20 of this embodiment will now be described with reference to FIG. 4. FIG. 4 is a flowchart depicting the procedure of the inspection method of the battery pack 20 carried out in this embodiment.

The inspection method of the battery pack 20 described below is mainly carried out between after the manufacturing of the battery pack 20 and an inspection of the main body before shipment. Accordingly, a defective battery pack 20 can be rejected at a high degree of accuracy before shipment. Safety of the information processing apparatus 100 can be thus improved. It should be appreciated, however, that the present invention is not limited to this configuration. The inspection described below may be conducted automatically after shipment of the information processing apparatus 100 to notify the user of an abnormality of the battery pack 20 in the event of an abnormality by displaying a message informing the presence of an abnormality on the display portion 2.

Initially, the battery pack 20 is detached from the main body portion 1 (Step S1). It should be noted that Step S1 is not performed immediately after the completion of manufacturing of the battery pack 20. When the battery pack 20 is brought into a detached condition, the microcomputer 24 shifts to a power saving mode (sleep condition) (Step S2).

When ten minutes (first time) have elapsed since the battery pack 20 was brought into a detached condition, the microcomputer 24 measures a voltage Vout of each cell block 22 and stores the voltage Vout in an internal ROM of the microcomputer 24 as an initial voltage Vout (first voltage) while the battery pack 20 was detached. In this instance, the microcomputer 24 starts to count an elapse time Tout (hereinafter, referred to as the detachment time Tout) since detachment of the battery pack 20 (Step S3). Further, in Step S3, the initial voltage Vout is recorded as an initial value of an attachment voltage Vin of each battery cell block 22 used in abnormal determination made when the battery pack 20 is re-attached to the main body portion 1 next time.

The reason why a voltage of each battery cell block 22 is measured after ten minutes since the detachment of the battery pack 20 in Step S3 is because a voltage fluctuation of each battery cell block 22 is relatively large immediately after the detachment of the battery pack 20. A voltage fluctuation of each battery cell block 22 becomes stable after an elapse of about ten minutes since the detachment of the battery pack 20. The voltage value after ten minutes since the detachment of the battery pack 20 is therefore used as the initial voltage Vout in a detachment state. It should be appreciated, however, that a time at which to measure the initial voltage Vout is not limited to after ten minutes since the detachment of the battery pack 20. For example, the time can be changed to suit the type of the battery cells 30, the cell block configuration, and the intended use.

Subsequently, the microcomputer 24 determines whether ten minutes have elapsed since the counting of the detachment time Tout was started (Step S3) or the detachment time Tout was updated (Step S5 described below)(Step S4).

When ten minutes have elapsed since the counting of the detachment time Tout was started (Step S3) or the detachment time Tout was updated (Step S5 described below) in Step S4, "YES" is determined in Step S4. In this case, the microcomputer 24 measures a voltage of each battery cell block 22 and defines the measured voltage as the attachment voltage Vin. The microcomputer 24 further adds ten minutes to the detachment time Tout (Tout=Tout+10 [min]) (Step S5). In short, the microcomputer 24 updates the attachment voltage Vin and the detachment time Tout in Step S5. After the processing in Step S5, the flow returns to Step S4 and determination processing in Step S4 is repetitively carried out.

Meanwhile, in a case where ten minutes have not elapsed since the counting of the detachment time Tout was started (Step S3) or the detachment time Tout was updated (Step S5) in Step S4, "NO" is determined in Step S4. In this case, the microcomputer 24 determines whether the battery pack 20 is attached to the main body portion 1 (Step S6).

In a case where the battery pack 20 is not attached to the main body portion 1 in Step S6, "NO" is determined in Step S6. In this case, the flow returns to Step S4 and the microcomputer 24 repeats the processing in and after Step S4 described above.

Meanwhile, in a case where the battery pack 20 is attached to the main body portion 1 in Step S6, "YES" is determined in Step S6. In this case, the microcomputer 24 records the attachment voltage Vin (second voltage) of each battery cell block 22 and the detachment time Tout (predetermined time), both of which are updated in Step S5 most recently (second time), into an internal ROM of the microcomputer 24. Further, in this instance, the microcomputer 24 records the initial voltage Vout measured in Step S3 in the internal ROM of the microcomputer 24. More specifically, the microcomputer 24 records a data set (information on a voltage drop across the battery) made up of the latest attachment voltage Vin and detachment time Tout of each battery cell block 22 as well as the initial voltage Vout, all of which are measured while the battery pack 20 was detached, in the internal ROM of the microcomputer 24 (Step S7).

Subsequently, the microcomputer 24 reads out a data set for abnormal determination used when the battery pack 20 was attached last time (a data set in which the detachment time Tout is the maximum (Tout_max)) from the internal ROM of the microcomputer 24. The microcomputer 24 then compares the maximum detachment time Tout_max in the read data set for abnormal determination with the detachment time Tout in the data set recorded in Step S7 upon attachment this time (Step S8).

In a case where the detachment time Tout in the data set recorded upon attachment this time is as long as or shorter than the maximum detachment time Tout_max in Step S8, "NO" is determined in Step S8 and the flow proceeds to processing in and after Step S10 described below.

Meanwhile, in a case where the detachment time Tout in the data set recorded upon attachment this time is longer than the maximum detachment time Tout_max in Step S8, "YES" is determined in Step S8. In this case, the microcomputer 24 records the data set recorded in Step S7 upon attachment this time into the internal ROM of the microcomputer 24 as the data set for abnormal determination of the battery pack 20 (Step S9). In short, the microcomputer 24 updates the data set for abnormal determination of the battery pack 20 in Step S9.

The reason why the data set in which the detachment time Tout is the maximum is used as the data set for abnormal determination of the battery pack 20 is because a voltage drop across the battery cell 30 is detected more easily when the detachment time Tout is longer and an abnormality is therefore detected in a more reliable manner.

Subsequently, the CPU 101 (abnormal determination portion) of the main body portion 1 runs an inspection program of the battery pack 20 and reads out the data set for abnormal determination updated in Step S9 from the battery pack 20. The CPU 101 then calculates a voltage drop rate $\Delta V/h$ of each battery cell block 22 and a voltage drop rate $\Delta V\_all/h$ of the entire battery pack 20 in accordance with the following equation (Step S10).

$$\Delta V/h = (V\text{out} - V\text{in})/(T\text{out\_max})$$

$$\Delta V\_all/h = (V\text{out\_all} - V\text{in\_all})/(T\text{out\_max})$$

Where Vout_all in the equation is an initial voltage of the entire battery pack 20 calculated by adding up the initial voltage Vout of each battery cell block 22 in the data set for abnormal determination, and Vin_all is an attachment voltage of the entire battery pack 20 calculated by adding up the attachment voltage Vin of each battery cell block 22 in the data set for abnormal determination.

Subsequently, the CPU 101 determines the presence or absence of an abnormality in the battery pack 20 on the basis of one or both of the voltage drop rate $\Delta V/h$ of each battery cell block 22 and the voltage drop rate $\Delta V\_all/h$ of the entire battery pack 20 it has calculated (Step S11). More specifically, for example, the CPU 101 compares the voltage drop rate $\Delta V\_all/h$ of the entire battery pack 20 with a determination threshold (for example, 1 [mV/h]) of the voltage drop rate $\Delta V\_all/h$ pre-stored in the ROM 102.

In a case where the calculated voltage drop rate $\Delta V\_all/h$ is equal to or below the determination threshold in Step S11, the CPU 101 determines the absence of an abnormality in the battery pack 20. In this case, "NO" is determined in Step S11 and the inspection of the battery pack 20 is ended.

Meanwhile, in a case where the calculated voltage drop rate $\Delta V\_all/h$ is above the determination threshold in Step S11, the CPU 101 determines the presence of an abnormality in the battery pack 20. In this case, "YES" is determined in Step S11 and the abnormality in the battery pack is notified to the user, for example, via the display portion 2 (Step S12). It should be noted that the determination using the voltage drop rate $\Delta V\_all/h$ of the entire battery pack 20 as above makes it possible to detect an abnormality, for example, a consumption current abnormality of the control board 23 and breaking of the battery cell 30.

Further, the CPU 101 compares, for example, the voltage drop rates $\Delta V/h$ of the respective battery cell blocks 22 in Step S11.

In this instance, in a case where differences of the voltage drop rate $\Delta V/h$ among the battery cell blocks 22 are equal to or smaller than a predetermined threshold, the CPU 101 determines the absence of an abnormality in the battery pack 20. In this case, "NO" is determined in Step S11 and the inspection of the battery pack 20 is ended.

Meanwhile, in a case where the differences of the voltage drop rates $\Delta V/h$ among the battery cell blocks 22 are larger than the threshold, the CPU 101 determines the presence of an abnormality in the battery pack 20. In other words, in a case where there is a battery cell block 22 having a voltage drop rate $\Delta V/h$ larger than the predetermined threshold in comparison with the other battery cell blocks 22, the CPU 101 determines the presence of an abnormality in the battery pack 20. In this case, "YES" is determined in Step S11 and the CPU 101 notifies the user of the abnormality in the battery pack 20, for example, via the display portion 2 (Step S12). It should be noted that the comparison determination of the voltage drop rates $\Delta V/h$ of the respective battery cell blocks 22 makes it possible to detect an abnormality of cell balance due to influences, for example, of poor welding of electrodes, poor soldering at the midpoint of the battery cell, and entrance of foreign matter (metal) during the manufacturing of the battery cell 30.

In this embodiment, an abnormality in the battery pack 20 is detected as described above. It is preferable to conduct an abnormal inspection of the battery pack 20 for a battery pack 20 that has been charged to some extent. To be more concrete, it is preferable to apply the inspection method to a battery pack 20 having a remaining filling amount within a region in which a voltage linearly drops with a decrease in remaining charge amount according to the discharge characteristic of the battery pack 20. Using such a battery pack 20 can lessen a variance of the voltage drop rate calculated in the inspection method.

As has been described, according to the inspection method of this embodiment, the battery pack 20 is brought into an unloaded condition and a voltage of the battery pack 20 and a variance thereof during the unloaded condition are measured by the microcomputer 24 in the battery pack 20 to detect an abnormality on the basis of the measurement result. Hence, in this embodiment, besides abnormal events detectable in the related art, the battery pack 20 is capable of detecting various abnormal events causing a slight variance that have been difficult to detect during charge and discharge cycles. Further, by applying the inspection method of this embodiment to the battery pack 20 before shipment, it becomes possible to supply a higher quality battery back 20 to the market.

In addition, because various abnormal events causing a slight variance as described above are detected by the inspection method of this embodiment, it is not necessary, for example, to provide special equipment or to make a circuit change. In other words, according to the battery pack 20 and the inspection method thereof of this embodiment, it becomes possible to detect, using a simpler configuration, an abnormal cause of the battery pack 20 that has been difficult to detect and thereby to further improve safety of the battery pack 20.

[Various Modifications]

The procedure of the inspection method of the battery pack 20 according to the embodiment of the present invention is not limited to the example described above with reference to FIG. 4 and can be modified as follows. It should be appreciated that the same advantages as the embodiment described above can be achieved by respective modifications described below.

According to the inspection method of the embodiment above, Step S4 in which to determine the count time is performed before Step S6 in which to determine attachment or detachment of the battery pack 20. The present invention, however, is not limited to this configuration. For example, the determination processing in Step S6 may be performed before the determination processing in Step S4.

Also, according to the inspection method of the embodiment above, processing to calculate a voltage drop rate (Step S10) is performed immediately before the abnormal determination processing (Step S11). The present invention, however, is not limited to this configuration. The processing to calculate a voltage drop rate can be performed at any timing before Step S11. For example, the voltage drop rate ΔV/h of each battery cell block 22 and the voltage drop rate ΔV_all/h of the entire battery pack 20 may be calculated when the data set is recorded into the internal ROM of the microcomputer 24 in Step S7 of FIG. 4. In other words, the data set for abnormal determination may contain the voltage drop rate ΔV/h of each battery cell block 22 and the voltage drop rate ΔV_all/h of the entire battery pack 20.

The inspection method of the embodiment above has described a case where a data set containing the maximum detachment time Tout_max is constantly used as the data set for abnormal determination. The present invention, however, is not limited to this configuration. For example, the latest data set recorded in Step S7 of FIG. 4 may be directly used as the data set for abnormal determination each time the battery pack 20 is reattached. In this case, the comparison determination processing of detachment time Tout (Step S8 of FIG. 4) and update processing of the data set for abnormal determination (Step S9 of FIG. 4) can be omitted. The inspection method therefore becomes further simpler.

According to the inspection method of the embodiment above, in the comparison determination of the detachment time Tout (Step S8 of FIG. 4), the flow proceeds to the processing in and after Step S10 in a case where the detachment time Tout in the data set recorded upon attachment this time is as long as or shorter than the maximum detachment time Tout_max. The present invention, however, is not limited to this configuration. In a case where "NO" is determined in Step S8, because data inspected in the past is used as the data set for abnormal determination, the inspection result in the past using this data set is known. Hence, in a case where "NO" is determined in Step S8 and an abnormality is absent in the inspection result in the past, the inspection may be ended after Step S8.

According to the inspection method of the embodiment above, the detachment time Tout is used in Step S8 of FIG. 4. However, a voltage drop amount ΔV (ΔV_all) may be used instead for the comparison determination so that a data set containing the maximum voltage drop amount is constantly used as the data set for abnormal determination.

The inspection method of the embodiment above has described a case where processing in Step S10 of FIG. 4 in which to calculate the voltage drop rate and thereafter is carried out by the main body portion 1. The present invention, however, is not limited to this configuration.

For example, all the processing in FIG. 4 may be carried out by the microcomputer 24 in the battery pack 20. In this case, for example, a warning lamp or the like is provided to the battery pack 20 and the warning lamp is lit in the event of an abnormality in the battery pack 20.

Alternatively, the comparison determination processing of the detachment time Tout (Step S8) of FIG. 4 and processing thereafter may be carried out by the CPU 101 of the main body 1. It should be noted, however, that when a different battery pack 20 is attached, because the characteristic of the battery pack 20 differs from one to another even the type is the same, it is necessary in this case to perform processing that suits the attached battery pack 20. To this end, it is preferable to include information (for example, ID information) to individually identify the attached battery pack 20 in the data set for abnormal determination.

The inspection method of the embodiment above has described a case where the voltage drop rate ΔV/h(ΔV_all/h) is used as a parameter for abnormal determination in Step S11 of FIG. 4. The present invention, however, is not limited to this case. For example, the voltage drop amount ΔV(ΔV_all) may be used as a parameter for abnormal determination.

The inspection method of the embodiment above has described a case where both the voltage drop rate ΔV/h of each battery cell block 22 and the voltage drop rate ΔV_all/h of the entire battery pack 20 are used for abnormal determination in Step S11 of FIG. 4. The present invention, however, is not limited to this case. For example, either one of these voltage drop rates alone may be used depending on intended use.

The inspection method of the embodiment above has described a case where information on a voltage drop across the battery cell 30 is acquired by the microcomputer 24 while the battery pack 20 is in a state (unloaded condition) where the battery pack 20 is detached from the main body portion 1. The present invention, however, is not limited to this case. For example, in a case where the main body portion 1 is furnished with the function of inhibiting charge and discharge of the battery pack 20 even when the battery pack 20 is attached to the main body portion 1, the inspection method of the embodiment above is applicable. In addition, even in a case where power consumption of the battery pack 20 is constant with respect to time while the battery pack 20 is attached to the main body portion 1, because a voltage drop across the battery pack 20 becomes constant, the inspection method of the embodiment above is applicable, too.

In a case where the inspection method of the embodiment above is used while the battery pack 20 is attached to the main body portion 1, information on a voltage drop across the battery cell 30 may be acquired by the microcomputer 24 in the battery pack 20 or, for example, by the main CPU on the side of the main body portion 1. In other words, in a case where the inspection method of the embodiment above is carried out while the battery pack 20 is attached to the main body portion 1, the voltage information acquisition portion that acquires information on a voltage drop across the battery cell 30 may be provided on the side of the main body portion 1 (on the outside of the battery pack 20).

It should be understood by those skilled in the art that various modifications, combinations, sub-combinations and alterations may occur depending on design requirements and other factors insofar as they are within the scope of the appended claims or the equivalents thereof.

What is claimed is:

1. A battery pack attachable to and detachable from an electronic device main body, said battery pack comprising:
   a chargeable and dischargeable battery; and
   a microcomputer that acquires information on a voltage drop across the battery in a condition equivalent to no load and stores the information therein,
   the condition equivalent to no load is a condition in which the battery pack is detached from the electronic device main body,
   the acquired information includes (i) an initial first voltage acquired at a first time in the condition equivalent to no load, said first time being approximately 10 minutes after the battery pack is detached from the electronic device main body, (ii) an updated first voltage acquired every 10 minutes after the first time while the battery pack remains detached from the electronic device main body, and (iii) a second voltage acquired at a second time which occurs after the first time and after the battery pack is re-attached to the electronic device main body, and
   the microcomputer calculates a value pertaining to the voltage drop (i) from the second voltage and the initial first voltage when the battery pack was detached from the electronic device main body for less than 10 minutes after said first time or (ii) from the second voltage and a latest updated first voltage when the battery pack was detached from the electronic device main body for 10 minutes or more after said first time.

2. The battery pack according to claim 1, further comprising:
a plurality of battery cell blocks each formed of the battery that includes a plurality of batteries,
wherein the microcomputer acquires information on a voltage drop across each battery cell block in the condition equivalent to no load and stores the information therein.

3. An electronic device comprising:
a chargeable and dischargeable battery, said battery being attachable to and detachable from the electronic device;
a voltage information acquisition portion that acquires information on a voltage drop across the battery in a condition equivalent to no load and stores the information therein; and
an abnormal determination portion that reads out the information on the voltage drop across the battery stored in the voltage information acquisition portion and determines presence or absence of an abnormality in the battery on the basis of the read information on the voltage drop across the battery,
the condition equivalent to no load is a condition in which the battery is detached from the electronic device,
the acquired information includes (i) an initial first voltage acquired at a first time in the condition equivalent to no load, said first time being approximately 10 minutes after the battery is detached from the electronic device, (ii) an updated first voltage acquired every 10 minutes after the first time while the battery remains detached from the electronic device, and (iii) a second voltage acquired at a second time which occurs after the first time and after the battery is re-attached to the electronic device, and
the abnormal determination portion calculates a value pertaining to the voltage drop (i) from the second voltage and the initial first voltage when the battery was detached from the electronic device main body for less than 10 minutes after said first time or (ii) from the second voltage and a latest updated first voltage when the battery was detached from the electronic device main body for 10 minutes or more after said first time, and determines the presence or absence of the abnormality in the battery on the basis of the calculated value.

4. An inspection method of a battery pack in an electronic device including a battery pack having a chargeable and dischargeable battery and a microcomputer, a battery pack attachment portion to which the battery pack is attachable thereto or detachable therefrom, and an abnormal determination portion determining presence or absence of an abnormality in the battery pack attached to the battery pack attachment portion, the inspection method comprising the steps of:
allowing the microcomputer in the battery pack to acquire information on a voltage drop across the battery in a condition equivalent to no load and store the information therein;
allowing the abnormal determination portion to read out the information on the voltage drop stored in the battery pack via the battery pack attachment portion; and
allowing the abnormal determination portion to determine the presence or absence of an abnormality in the battery pack on the basis of the read information on the voltage drop across the battery,
the condition equivalent to no load is a condition in which the battery pack is detached from the battery pack attachment portion,
the acquired information includes (i) an initial first voltage acquired at a first time in the condition equivalent to no load, said first time being approximately 10 minutes after the battery pack is detached from the battery pack attachment portion, (ii) an updated first voltage acquired every 10 minutes after the first time while the battery pack remains detached from the battery pack attachment portion, and (iii) a second voltage acquired at a second time which occurs after the first time and after the battery pack is re-attached to the battery pack attachment portion, and
the step of allowing the abnormal determination portion to determine the presence or absence of the abnormality involves calculating a value pertaining to the voltage drop (i) from the second voltage and the initial first voltage when the battery pack was detached from the battery pack attachment portion for less than 10 minutes after said first time or (ii) from the second voltage and a latest updated first voltage when the battery pack was detached from the battery pack attachment portion for 10 minutes or more after said first time, and determining the presence or absence of the abnormality in the battery pack on the basis of the calculated value.

* * * * *